(12) United States Patent
Bauchot et al.

(10) Patent No.: US 9,686,082 B2
(45) Date of Patent: *Jun. 20, 2017

(54) GENERATING AND PROCESSING AN AUTHENTICATION CERTIFICATE

(71) Applicant: International Business Machines Corporation, Armonk, NY (US)

(72) Inventors: Frederic Bauchot, Saint-Jeannet (FR); Gerard Marmigere, Drap (FR); Christophe Mialon, Vence (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,865

(22) Filed: Feb. 19, 2016

(65) Prior Publication Data

US 2016/0173285 A1 Jun. 16, 2016

Related U.S. Application Data

(63) Continuation of application No. 14/506,732, filed on Oct. 6, 2014, now Pat. No. 9,313,025, which is a (Continued)

(30) Foreign Application Priority Data

Mar. 31, 2006 (EP) .................................... 06300317

(51) Int. Cl.
*H04L 29/06* (2006.01)
*H04L 9/32* (2006.01)
*H04L 9/08* (2006.01)

(52) U.S. Cl.
CPC .......... *H04L 9/3263* (2013.01); *H04L 9/0816* (2013.01); *H04L 9/0866* (2013.01); (Continued)

(58) Field of Classification Search
CPC .. H04L 9/3263; H04L 9/3242; H04L 2209/24
(Continued)

(56) References Cited

U.S. PATENT DOCUMENTS

| 5,768,384 A | 6/1998 | Berson |
| 6,950,941 B1 * | 9/2005 | Lee .......................... G06F 21/10 |
| | | 713/156 |

(Continued)

FOREIGN PATENT DOCUMENTS

| EP | 1587018 A2 | 10/2005 |
| WO | 9904364 | 1/1999 |

OTHER PUBLICATIONS

Beato, "practical Identity-based Private sharing for online Social Networks", Jan. 2016, Computer Communications, p. 243-250.*
(Continued)

*Primary Examiner* — Taghi Arani
*Assistant Examiner* — Gregory Lane
(74) *Attorney, Agent, or Firm* — Schmeiser, Olsen & Watts, LLP; John Pivnichny (57) ABSTRACT

A method and system for generating and processing an authenticity certificate. A request for a step certificate is received from a requester entity. The step certificate authenticates an involvement of the requester entity about an object. The request includes an object identifier, a requester entity type of the requester entity, and a requester identity certificate of the requester entity. The object identifier is hashed. A signature is created and includes the hashed object identifier, the requester entity type, a certifier identity certificate, and the requester identity certificate. A hashing result is generated by hashing a concatenation of the object identifier, the requester entity type, the certifier entity certificate, the requester identity certificate, and the signature. The step certificate is generated and includes the hashing (Continued)

result. The step certificate is encrypted. The encrypted step certificate is sent to the requester entity for subsequently storing the step certificate on a media.

20 Claims, 6 Drawing Sheets

Related U.S. Application Data continuation of application No. 13/855,048, filed on Apr. 2, 2013, now Pat. No. 8,929,553, which is a continuation of application No. 12/295,330, filed as application No. PCT/EP2007/051456 on Feb. 14, 2007, now Pat. No. 8,447,038.

(52) U.S. Cl.
CPC .......... *H04L 9/3223* (2013.01); *H04L 9/3234* (2013.01); *H04L 9/3236* (2013.01); *H04L 9/3242* (2013.01); *H04L 9/3247* (2013.01); *H04L 2209/24* (2013.01); *H04L 2209/605* (2013.01); *H04L 2209/64* (2013.01)

(58) Field of Classification Search
USPC ....................................................... 380/278
See application file for complete search history.

(56) References Cited

U.S. PATENT DOCUMENTS

| | | | | |
|---|---|---|---|---|
| 7,225,333 | B2* | 5/2007 | Peinado | G06F 21/10 713/1 |
| 7,574,607 | B1* | 8/2009 | Liu | H04L 9/3247 713/156 |
| 8,447,038 | B2 | 5/2013 | Bauchot et al. | |
| 8,929,553 | B2 | 1/2015 | Bauchot et al. | |
| 8,989,387 | B2 | 3/2015 | Bauchot et al. | |
| 2004/0076404 | A1 | 4/2004 | Nakano et al. | |
| 2004/0190868 | A1 | 9/2004 | Nakano et al. | |
| 2004/0230528 | A1 | 11/2004 | Chu | |
| 2005/0080899 | A1* | 4/2005 | Vogel | H04L 9/3236 709/225 |
| 2005/0172118 | A1* | 8/2005 | Nasu | G03G 21/04 713/156 |
| 2005/0172128 | A1* | 8/2005 | Little | H04L 12/58 713/168 |
| 2005/0195975 | A1 | 9/2005 | Kawakita | |
| 2005/0234828 | A1* | 10/2005 | Matsuyama | G06F 21/10 705/51 |
| 2006/0112284 | A1* | 5/2006 | Kato | G06F 21/10 713/193 |
| 2006/0129838 | A1* | 6/2006 | Chen | G06F 21/32 713/186 |
| 2006/0265338 | A1* | 11/2006 | Rutkowski | G06Q 20/3829 705/71 |
| 2008/0237359 | A1* | 10/2008 | Silverbrook | G06Q 10/087 235/494 |
| 2009/0106549 | A1 | 4/2009 | Mohamed | |
| 2015/0058635 | A1 | 2/2015 | Bauchot et al. | |

OTHER PUBLICATIONS

Intel Corporation et al.; "Content Protection for Recordable Media Specification: DVD Book, Revision 0.94"; Internet Citation, [Online] Oct. 18, 2000; XP002167964; Retrieved from the Internet: URL:http://www.4centity.com/4centity/tech/cprm/> [retrieved on May 21, 2001] the whole document.
Notice of Allowance (Mail Date Jun. 7, 2012) for U.S. Appl. No. 12/295,330, filed Sep. 30, 2008, First Named Inventor Bauchot et al.
Response After non-final Action (Sep. 7, 2012) for U.S. Appl. No. 12/295,330, filed Sep. 30, 2008, First Named Inventor Bauchot et al.
Non-Final Rejection (Mail date Jun. 7, 2012) for U.S. Appl. No. 12/295,330, filed Sep. 30, 2008, First Named Inventor Bauchot et al.
Preliminary amendment (Sep. 30, 2008) for U.S. Appl. No. 12/295,330, filed Sep. 30, 2008, First Named Inventor Bauchot et al.
U.S. Appl. No. 13/855,048, filed Apr. 2, 2013, First Named Inventor Frederic Bauchot.
Amendment (Filed Aug. 1, 2014) for U.S. Appl. No. 13/855,048, filed Apr. 2, 2013, First Named Inventor Frederic Bauchot.
Office Action (mail date May 8, 2014) for U.S. Appl. No. 13/855,048, filed Apr. 2, 2013, First Named Inventor Frederic Bauchot.
Notice of Allowance (mail date Sep. 2, 2014) for U.S. Appl. No. 13/855,048, filed Apr. 2, 2013, First Named Inventor Frederic Bauchot.
Office Action (Mail date Jun. 23, 2014) for U.S. Appl. No. 13/855,079, filed Apr. 2, 2013.
Preliminary Amendment (Aug. 19, 2014) for U.S. Appl. No. 13/855,079, filed Apr. 2, 2013.
Amendment (Sep. 22, 2014) for U.S. Appl. No. 13/855,079, filed Apr. 2, 2013.
Notice of Allowance (Jan. 12, 2016) for U.S. Appl. No. 14/506,732, filed Oct. 6, 2014.
Office Action (Jun. 26, 2015) for U.S. Appl. No. 14/506,732, filed Oct. 6, 2014.
Amendment (Sep. 28, 2015) for U.S. Appl. No. 14/506,732, filed Oct. 6, 2014.
Mou et al., A secure media streaming Mechanism Combining Encryption, Authentication and transcoding, Nov. 2009, Signal Processing: Image Communication, pp. 825-833.

* cited by examiner

| object ID | made | sold | manuf. ID | manuf. date | retail. ID | sell date | revoked | rem. |
|---|---|---|---|---|---|---|---|---|
| 1000001 | true | false | 1002 | 30/11/2005 | - | - | | |
| 1000002 | false | false | - | - | - | - | | |
| 1000003 | true | true | 1002 | 30/11/2005 | 2012 | 02/12/2005 | | |
| ... | ... | ... | ... | ... | ... | ... | | |
| 1010001 | false | false | - | - | - | - | | |
| 1010002 | true | true | 1002 | 29/11/2005 | 2012 | 01/12/2005 | | |

Figure 4

| manuf. ID | name | address | phone | e-mail | revoked | rem. |
|---|---|---|---|---|---|---|
| 1001 | | | | | | |
| 1002 | | | | | | |
| 1003 | | | | | | |
| ... | ... | ... | ... | ... | | |
| 1101 | | | | | | |
| 1102 | | | | | | |

GENERATING AND PROCESSING AN AUTHENTICATION CERTIFICATE

This application is a continuation application claiming priority to Ser. No. 14/506,732, filed Oct. 6, 2014, now U.S. Pat. No. 9,313,025, issued Apr. 12, 2016, which is a continuation of Ser. No. 13/855,048, filed Apr. 2, 2013, U.S. Pat. No. 8,929,553, issued Jan. 6, 2015, which is a continuation of 12/295,330, filed Sep. 30, 2008, U.S. Pat. No. 8,447,038, issued May 21, 2013.

FIELD OF THE INVENTION

The present invention relates generally to method and systems for preventing counterfeiting and theft of brand objects and more specifically to a method and systems using RFID, bar code, or the like, used in conjunction with authenticity certificates, for detecting counterfeited or stolen brand objects, using Content Protection for Recordable Media technology.

BACKGROUND OF THE INVENTION

Counterfeiting, the illegal manufacturing and selling of brand copyright-protected articles, poses a huge and still increasing threat to global businesses—including organizations in the life sciences, consumer products, media, luxury goods, and food and beverages industries. Likewise, stolen merchandise which are then resold through traditional or "parallel" distribution channels seriously affect trade market in general.

Statistics published by the European Commission show a significant increase in the amount of counterfeit and pirated articles seized at the EU's external orders in 2003. Customs officials seized almost 100 million such articles in 2003 compared with 85 million in 2002, of an estimated value of one billion euros.

More recently, the World Customs Organization estimates counterfeiting accounts for 5% to 7% of global merchandise trade, equivalent to lost sales of as much as $512 billion in 2004. In terms of numbers, it is currently admitted that theft and diversions now affect 1-3% of goods in the supply chain, and that product counterfeiting accounts for 5-7% of all global trade. These problems are worsening due to the increasing globalization process.

Major repercussions of these activities include of course loss of revenue for the enterprise, but undermine the trade market globally. It is threatening branding, intellectual property, and research and development. It might carry along also a negative impact on brand image when customers eventually realize they are not getting the quality of products they come to expect from the trademark or the quality label they thought they own. Counterfeiting and piracy also affect the labor market, as many jobs are lost as a consequence of these fraudulent activities.

Figure 1:
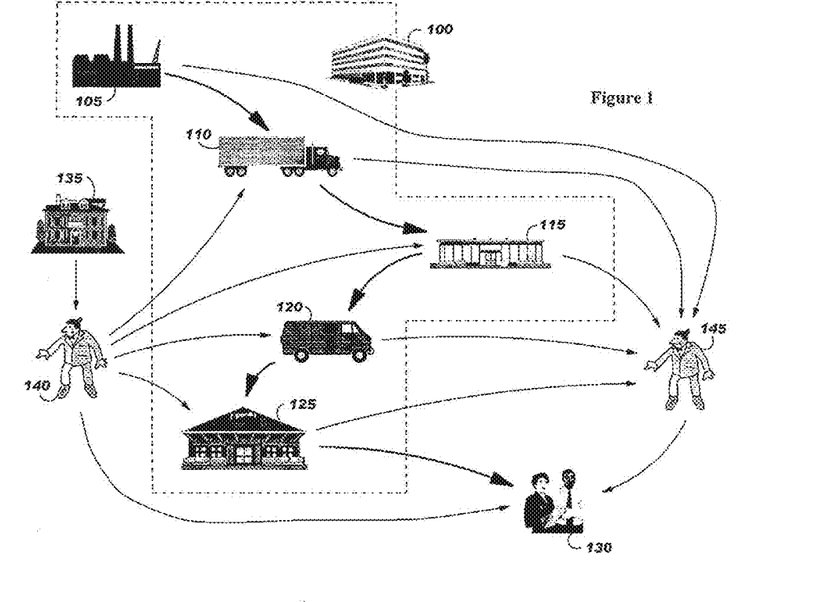
FIG. 1 illustrates the simplified supply chain from a merchandise manufacturing to the merchandise selling, the distribution chain of counterfeited objects, as well as the distribution chain of stolen branded goods.

FIG. 1 depicts a simplified standard process from a merchandise manufacturing to the merchandise selling, as illustrated with bold arrows. Brand company 100 orders a limited series of objects, or items, to a manufacturer 105. After production of object's series, manufacturer, using a means for transportation 110 (air freight, marine transport or by road), sends the object's series to a wholesaler 115 who is in charge to dispatch subset of object's series to various trusted retailer 125. Wholesalers use generally transportation by road (120) for delivery to retailer. Finally, the retailer 125 sells the branded goods to a customer 130. Today, large distribution companies take in charge the objects from the manufacturer to the retailer. Thin arrows depict samples of counterfeited objects and different means to distribute these counterfeited objects to customers, as well as branded goods that are stolen before being sold. A counterfeiter 135 produces copies of branded goods and via a dishonest dealer 140 distributes said counterfeited branded goods directly to the customer 130 or re-injects them in the normal distribution chain with or without the complicity of a third party working in this normal distribution chain. Re-injection of counterfeited branded goods may be done at different levels of the distribution chain as the transit 110, the wholesaler 115, the distribution 120, or finally the retailer 125. So, even if a customer buys a branded good in a shop, he/she has no guaranty about the authenticity of said branded object. Likewise, branded goods stealing may be done at different levels of the chain by thief 145: in the manufacturer area 105 or in the distribution chain at the transit 110, the wholesaler 115, the distribution 120, or finally the retailer 125. Customer 130 who buys this stolen branded good, generally knows that the object has been stolen.

Whatever the way looking at it, counterfeit and theft problems can't and won't be totally eliminated. So the only reasonable objective then consists in trying to keep them under control, by raising the barriers to casual violations, and by requiring a concerted and even more complex effort by attackers.

The scale of the threat is prompting new efforts by multinationals to stop, or at least curb, the spread of counterfeits. Steps have been taken to protect by law, which can be a disincentive for some potential violators of rights. Companies are also more and more pressuring governments to crack down on counterfeiting, trying to ensure a way to protect Intellectual Property.

There is a need to help brand companies to implement solutions based on proven prevention, detection, and response strategies and tactics.

As factories across the world gain experience with high-end manufacturing, counterfeits have become more sophisticated as well. Counterfeiters have become so proficient that it can take an expert to recognize a fake product.

This is one of the reasons why IT-based solutions are envisioned as great technological contributors in acting against counterfeiters, putting innovation to work to protect a global economy itself driven by innovation.

Some solutions using electronic tagging are being experimented today in specific industries. For instance, a company has developed an electronic pedigree software and provides the expertise to safeguard and secure the pharmaceutical supply chain. This pedigree system, based on a Radio Frequency Identifier (RFID) tag with a unique Electronic Product Code (EPC), tracks all the information about a product as it moves through the supply chain, from the manufacturer all the way to the point of sale. Although this methodology represents a step forward in the war against counterfeiting and theft, a potential limitation rises from the fact that the Pedigree itself could be read and possibly copied or imitated, and then used abusively by fraudulent parties until the illegal procedure is detected and acted upon. A major requirement consists therefore in relying on a different, and possibly complementary, system that will use a strong encryption mechanism to protect vital product data.

Therefore what seems essential to deploy is a generic—applicable to any type of manufactured goods—, standard-based and robust way to create and securely manage a digital Certificate of Authenticity, that will be encrypted and uniquely bound to the corresponding product and its accompanying media—a certificate container—. This Certificate should integrate a proven mechanism for protecting its digital content against unauthorized copy and reproduction. This Certificate would be used to verify and hopefully guarantee the authenticity of a product through a process checking that there is a perfect match between a Product Identifier Code and information derived from its Certificate of Authenticity.

At the same time, in order for this protection and detection mechanism to be successful, it must be cost-effective to implement, run on low-cost 'checking' devices, and it must be as secure as possible. It also needs to be easy, if not transparent, to consumers.

Additional objectives might address possibilities to track and react very quickly to any violation, potentially trace it back to the originator, and to ensure a renewal mechanism without blocking the entire system whenever a situation of fraud is discovered.

SUMMARY OF THE INVENTION

Thus, it is a broad object of the invention to remedy the shortcomings of the prior art as described here above.

It is another object of the invention to provide means for generating an authenticity certificate comprising at least the encrypted brand object identifier and the brand company certificate.

It is still another object of the invention to provide means for encoding transit, wholesaler, and/or delivery identity certificates, as well as the manufacturer and/or retailer identity certificates, or any other identity certificate of any party acting in a brand good supply chain, in an authenticity certificate.

It is another object of the invention to provide means to a brand company server for encrypting keys and data in an authenticity certificate, the data containing at least the merchandise identifier and the identity certificate of a requester of means for authenticating its involvement in the brand good supply chain.

It is still another object of the invention to provide means for creating authenticity certificates using CPRM like technology.

The accomplishment of these and other related objects is achieved by a method for generating an authenticity certificate to be stored on a media, said authenticity certificate being associated with an object for authenticating said object, said media and said object having each a unique identifier, said media comprising a media key block, said method comprising the steps of, receiving a request for a step certificate from an entity, the step certificate authenticating the involvement of said entity about said object, said request comprising,
the identifier of said media and the media key block stored therein;
the identifier of said object;
the type of said entity requesting said step certificate; and,
the identity certificate of said entity requesting said step certificate;
generating a random key;
hashing said object identifier;
creating a signature being the hashing result of said object identifier, said type of the entity requesting said step certificate, the identity certificate of the entity certifying the authenticity of said object, and said identity certificate of said entity requesting said step certificate;
generating a step certificate comprising the hashing result of said object identifier, the type of the entity requesting said step certificate, said identity certificate of the entity certifying the authenticity of said object, said identity certificate of said entity requesting said step certificate, and said signature;
encrypting said step certificate using said generated random key;
transmitting said random key, said media identifier, and said media key block to a clearing house;
receiving an encrypted random key from said clearing house, said encrypted random key being based upon said random key, said media identifier, and said media key block; and,
transmitting said encrypted step certificate and said encrypted random key to be written on said media;

and by a method for authenticating an object associated to an authenticity certificate generated according to the method described above, said method comprising the steps of, receiving the identifier of the media where is stored said authenticity certificate and the associated media key block;
receiving the identifier of said object to be authenticated,
receiving one encrypted step certificate of said authenticity certificate;
receiving the encrypted random key associated to said one encrypted step certificate of said authenticity certificate;
decrypting said encrypted random key using the identifier of said media and the associated media key block;
decrypting said one encrypted step certificate using said decrypted random key;
extracting the hashing result of the object identifier encoded within said one decrypted step certificate;
hashing the identifier of said object to be authenticated; and,
comparing said extracted hashing result of the object identifier encoded within said one decrypted step certificate and said hashing result of the identifier of said object to be authenticated.

Further embodiments of the invention are provided in the appended dependent claims.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

According to the invention, an identification tag and an authenticity certificate are associated to the branded goods to be checked for detecting counterfeiting or theft. Both identification tag and authenticity certificate are generated at manufacturing time. The authenticity certificate is updated by the retailer in the presence of the customer. The authenticity certificate, based upon Content Protection for Recordable Media (CPRM) technology, is not duplicable nor forgeable. In a preferred embodiment, the identification tags comprise either a Radio Frequency Identifier (RFID) tag or a bar code.

The authenticity certificate, stored on a specific media, can not be duplicated thanks to CPRM technology. The authenticity certificate can be seen as a set of step certificates, maintained by the brand company to certify that brand good has been manufactured, transported, sold, or the like, by an authorised party i.e., to authenticated each step of the supply chain, or selected steps, of the brand good life cycle from the manufacturing to its selling. An authenticity certificate may comprise as many step certificates such as manufacturer certificate or retailer certificate, as required. The authenticity certificate further comprises general information such as media identifier and media key block.

The method and system of the invention is adapted to detect counterfeit or stolen merchandise. It is based upon,
  a merchandise identifier which is a tag included by the manufacturer in the object for which the authenticity has to be guaranteed. This tag may be an optical readable tag like bar code, a Radio Frequency IDentifier (RFID), or any other tag readable by wired or wireless means;
  an Authenticity Certificate (AC) generated at manufacturing time and updated at least by the retailer in the presence of the customer. Information's recorded on this certificate are generated by the brand company, thanks to a clearing house that generates an encrypted title key for each step certificate. Authenticity certificate is not duplicable nor forgeable. It is based on a CPRM like technology allowing the data to be encrypted with a random key, referred to as title key, such title key being encrypted with the hashing of a unique key called media key concatenated to the media identifier. Authenticity certificate contains several step certificates with their associated encrypted title keys. It must contain at least a step certificate for the manufacturer and an other one for the retailer to authenticate associated good and to certify it has been properly sold. Step certificate contains,
    the result of the hashing of the manufactured object identifier (allowing the object identifier to be unreadable and undeterminable, and to prevent the creation of counterfeited object with an object identifier corresponding to a stolen authenticity certificate);
    the requester identity certificate e.g., manufacturer or retailer;
    the requester type e.g., "manufacturer", "retailer", or any other party involved in the supply chain;
    the brand company identity certificate; and,
    other information such as manufacturing and sale date may be recorded for traceability purpose;
    the signature which is the result of the hashing of all the previous data encrypted with the brand company private key.

The apparatuses according to the invention for creating and updating authenticity certificates, and for detecting counterfeited or stolen objects comprise,
  AC Creator (ACC), which may be a computer or a handled device equipped with,
    means to connect the authenticity certificates media;
    means to read from and to write to the authenticity certificates media (read both the media identifier and the media key block; write both the encrypted title key and the encrypted authenticity certificate);
    means to read the object identifier; and,
    means to communicate with the brand company server;
  AC Fraud Detector (ACFD), which may be a computer or a hand-held device equipped with,
    means to connect the authenticity certificates media;
    means to read from the authenticity certificates media the media identifier (media ID), the Media Key Block (MKB), the encrypted title key, and the encrypted step certificates;
    means to read the object identifier; and,
    means to determine counterfeited or stolen object.

For sake of clarity it is assumed that,
  a media ID is an identifier that is unique to each recordable media used for storing authenticity certificate. It is used to cryptographically bind content to that instance of recordable media and to prevent indiscriminate copying to other media;
  a media key is a key that is used to unlock the title keys stored on a media that contains data protected by CPRM. The media key can be computed by successfully processing a MKB;
  a Media Key Block (MKB) is a critical component of the key management system. The MKB is a data block that provides access to a common key (media key) that can be accessed by any device containing the necessary secret keys, that is not revoked;
  a title key is the key used to encrypt data;
  an object ID is a code which identifies uniquely a branded good;
  an Authenticity Certificate (AC) is a certificate which proofs the authenticity of a branded good at the manufacturing and retailer levels;
  an identity certificate is a certificate which proofs the authenticity of its owner e.g., the manufacturer; and,
  a step certificate is a certificate which proofs the validity of a step in the supply chain e.g., to proof that an object has been validly manufactured by an authorised manufacturer.

Content Protection for Recordable Media (CPRM)

Content Protection for Recordable Media (CPRM) defines a renewable method for protecting content recorded on a number of physical media types such as, DVD Book;

portable ATA Storage Book; and,

Secure Digital (SD) Memory Card Book.

The use of this specification and access to the intellectual property and cryptographic materials required to implement it is subject of a license. License authority, known as the 4C Entity, LLC, is responsible for establishing and administering the content protection system based in part on this specification.

CPRM technology is designed to meet the following general criteria, meeting the content owners' requirements for robustness and system renewability;

applicable for both audio and video content;

equally suitable for implementation on personal computer and hand-held devices; and, applicable to different media types.

The system is based on the following technical elements, key management for interchangeable media;

content encryption; and, media based renewability.

Figure 2:
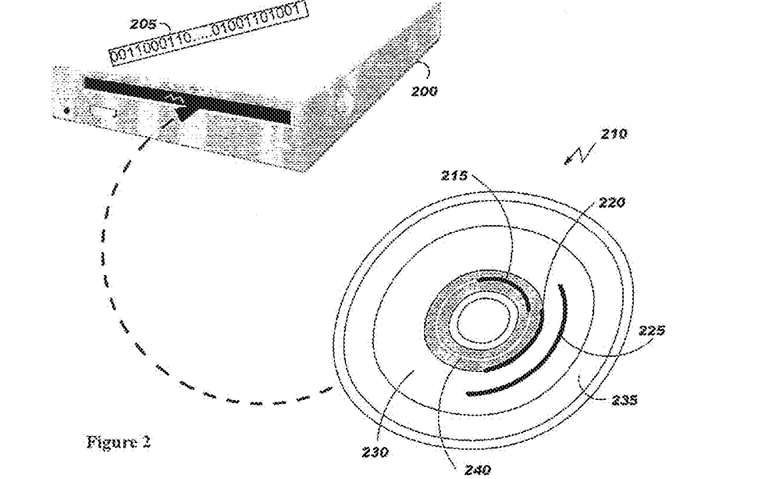
FIG. 2 shows a simplified illustrative example of a DVD player device and media embedding CPRM features showing how CPRM technology operates.

FIG. 2 shows a simplified illustrative example of a DVD player device 200 and a DVD media 210 embedding CPRM features showing how the system operates. The actual details of component storage and cryptographic key management will vary with different types of DVD and other supported media, as well as with different applications, as described in the other books of this specification.

The 4C Entity, LLC provides secret device keys 205 to the device manufacturer for inclusion into each device produced 200.

Media manufacturers place a media identifier 215 and media key block 220 generated by the 4C Entity, LLC on each piece of compliant media 210.

Content 230 stored on the media is encrypted and decrypted by a media key derived from a one-way function of an encrypted title key 225 and the Copy Control Information (CCI) associated with the content. The title key 225 is encrypted and stored on the media 210 using a key derived from a one-way function of the media key block 220 and media identifier 215. Again, actual details of key management can vary among different applications, as described in the other books of this specification.

Media 210 may also comprise unrecorded areas 235 and a pre-embossed lead-in area 240.

When compliant media 210 is placed within a compliant drive or player/recorder 200, a secret media key is generated by the device using its secret device keys 205 and the media key block 220 stored on the media itself. The same secret media key is generated regardless of which compliant device is used to access the media.

The process of decrypting content stored on a DVD-R or DVD-RW protected with CPRM, is as follows, once the media key has been generated, the playback device (in this particular case, a DVD Player) reads the media identifier from the disc and calculates the media unique key using a cryptographic one-way function;

the playback device reads the encrypted title key resident on the disc, and calculates the original title key using the C2 cipher function in ECB Mode;

the content key is then derived from another one-way cryptographic function based on the title key;

the resulting content key, after precise conditions are cryptographically verified using copy control information associated with the content, is finally used to decrypt the audiovisual content.

RFID Systems

As mentioned above, one of the embodiment of the invention is base upon the use of RFID. The core of any RFID system is the 'Tag' or 'Transponder', which can be attached to or embedded within objects, wherein data can be stored. An RFID reader sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Basically, the reader antenna emits a signal that is received by an RFID tag. The signal is reflected in the RFID tag and re-emitted, the reflected signal being modulated according to the data stored within the tag.

Method and System for Detecting Counterfeited and Stolen Objects

Figure 3:
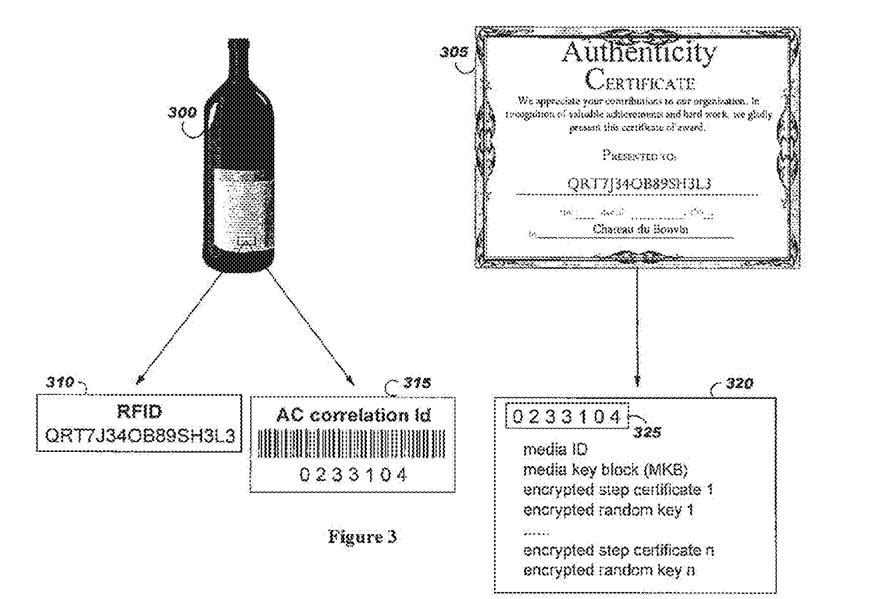
FIG. 3 shows a branded object and its associated authenticity certificate.

FIG. 3 shows a branded object 300 and its associated authenticity certificate 305 (paper representation). The branded object contains a pair of identifiers. The first identifier is an object identifier (object ID) 310 which may be recorded in an RFID tag as shown, an optically readable code bar, or any other power less support readable by wireless means. This object identifier is a unique reference associated to the branded good and is used to certify the authenticity of said branded good. The second identifier is an authenticity certificate correlation identifier (AC correlation ID) 315, allowing to associate an elementary certificate with the corresponding branded good in the case where the authenticity certificate transits from the manufacturer to the retailer by different means than the branded good. This AC correlation ID may be human readable (printing, labeling), readable by optical or electronic means (code bar, RFID or any other power less support readable by wireless means), or both. This AC correlation ID 315 can be on the same support than the object ID 310. The authenticity certificate 320 is labeled with the AC correlation ID 325. Like the authenticity certificate of the branded good, the authenticity correlation ID 325 is human, optically or electronically readable. Main information recorded on the authenticity certificate 320 are:

the media identifier (media ID);

the media key block (MKB);

encrypted step certificates, each having, the result of hashing the manufactured object identifier (that turns the object identifier as unreadable, incalculable and prevents to create counterfeited objects with the object identifier corresponding to a stolen authenticity certificate);

the requester certificate (e.g. manufacturer or retailer certificate);

the requester type ("manufacturer" or "retailer");

the brand certificate;

other information such as manufacturing and sale date as well as elementary certificates of all intermediary parties between the manufacturer and the retailer may be recorded for traceability purpose; and, the signature which is the result of hashing all previous data encrypted with the brand private key; and, encrypted random keys corresponding to each encrypted step certificate.

Figure 4:
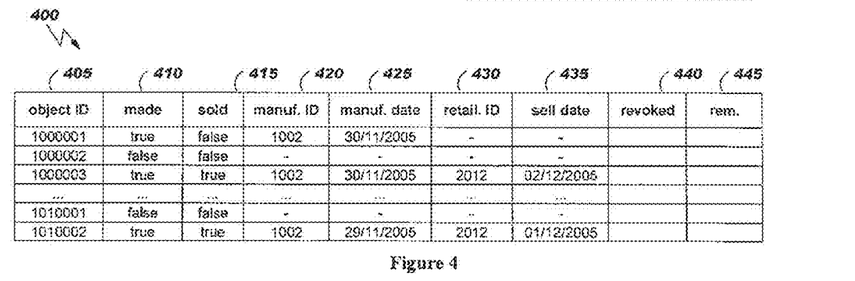
FIG. 4 depicts a first one of the tables used by the originator brand company to manage marked objects and authenticity certificates. The table of FIG. 4 is used to record the identifiers of the objects to authenticate, and their status.
Figure 5:
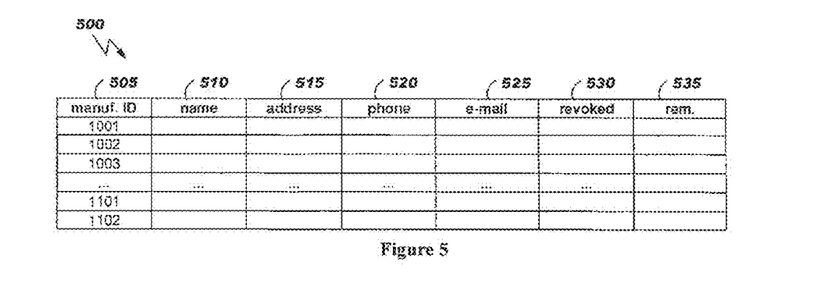
FIG. 5 illustrates a second one of the tables used by the originator brand company to manage marked objects and authenticity certificates. The table of FIG. 5 is used to record information relative to the manufacturers of objects to authenticate.
Figure 6:
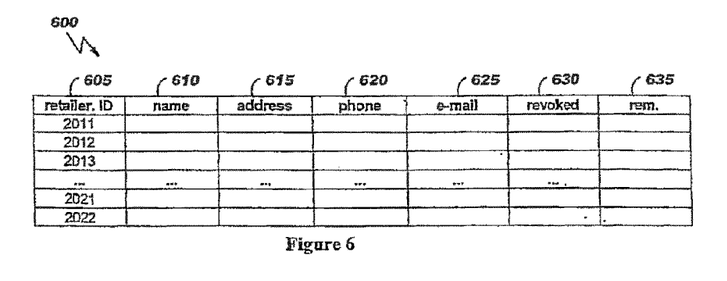
FIG. 6 shows a third one of the tables used by the originator brand company to manage marked objects and authenticity certificates. The table of FIG. 6 is used to record information relative to the retailers of objects to authenticate.

FIGS. 4, 5, and 6 show the tables used by the brand company computer or server for delivering authenticity certificates. Brand good table 400 of FIG. 4 is used to record all object ID and their status. As soon as a brand company orders to a manufacturer a set of goods, the list of object ID delivered by the brand company is recorded in the field 405. When the manufacturer requests an authenticity certificate, the field "made" 410 corresponding to this object ID is set to "true" and the field "manufacturer ID" 420 and "manufacturing date" 425 are filled. Likewise, when a retailer sells the brand good and requests an authenticity certificate, the field "sold" 415 is set to true and fields "retailer ID" 430 and "sell date" 435 are updated. Field "revoked" 440 indicates that the object ID has been invalided. Table 400 may comprise further columns e.g., column 445 for storing miscellaneous information related to delivery process.

FIG. 5 depicts the manufacturer table 500. Field "manuf ID" 505 indicates the unique manufacturer identifier. This identifier is used to associate an object ID to a manufacturer in the brand good table 400, described above. Other fields give complete information about the manufacturer such as the complete name 510, his postal address 515, his phone number 520, and his electronic mail address 525. Other information belonging to this manufacturer like fax number and some legal identifiers may also be recorded, starting from field 535. Field "revoked" 530 is set to true as soon as the manufacturer has been revoked by the brand company.

FIG. 6 depicts the retailer table 600. Field "retailer ID" 605 indicates the unique retailer identifier. This identifier is used to associate an object ID to the retailer who sold this brand object in the brand good table 400. Other fields give complete information about the retailer such as the complete name 610, his postal address 615, his phone number 620, and his electronic mail address 625. Other information belonging to this retailer like fax number and some legal identifiers may also be recorded, starting from field 635. Field "revoked" 630 is set to true as soon as the retailer has been revoked by the brand company.

Figure 7:
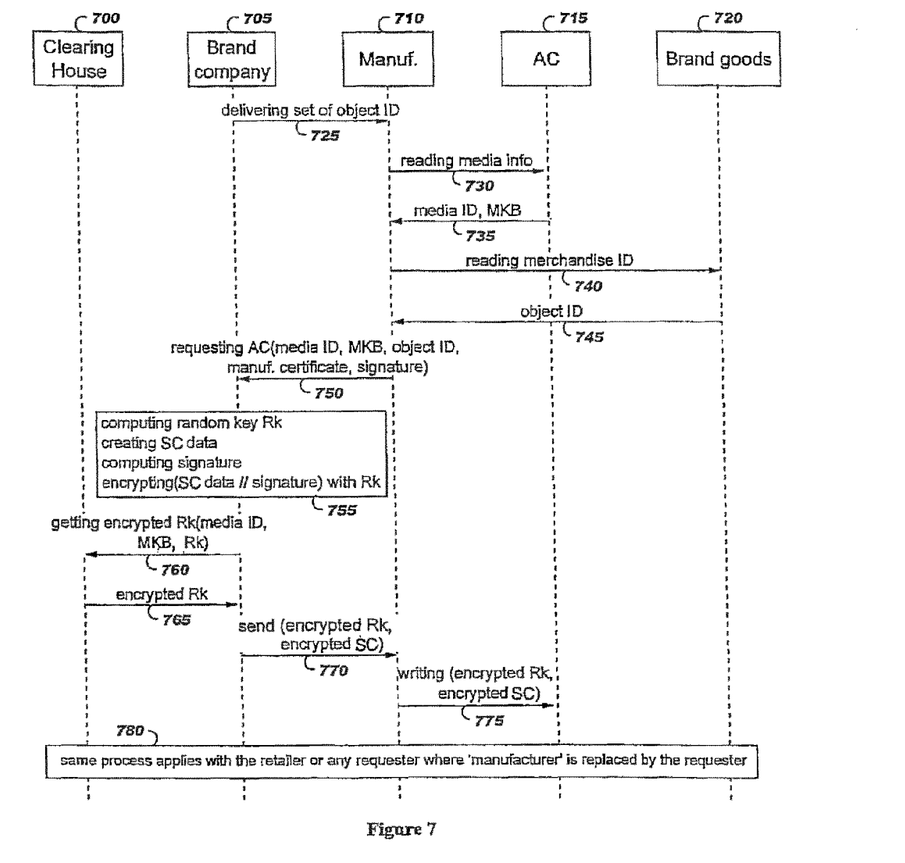
FIG. 7 depicts an example of the process flow to create the step certificate of an authenticity certificate, the step certificate being requested by the manufacturer after having manufactured the objects to authenticate.

FIG. 7 depicts the messages flow to get a step certificate requested by a manufacturer to authenticate a brand good. Brand company 705 orders to manufacturer 710 a set of brand goods and provides the manufacturer 710 with a set of object identifiers (step 725) to be associated to the brand goods. When an object has been manufactured and the object identifier is inserted in it, a step certificate is created. To that end, the manufacturer 710 reads (step 730) the media information written on the authenticity certificate 715 e.g., a SD memory card, that returns (step 735) the media identifier (media ID) and the media key block (MKB). In turn, object identifier is read (steps 740 and 745) on the brand good 720. When all necessary information has been collected i.e., media ID, MKB, and object ID, the step certificate requester i.e., the manufacturer, sends a message requesting authenticity certificate (step 750). This request contains media ID, MKB, object ID, the manufacturer identity certificate and a signature corresponding to the hashing of the concatenation of previous information's encrypted with the private key of the manufacturer. After having controlled the validity of the received data, a computer or server of the brand 705 creates a step certificate (SC) using object ID, brand certificate, manufacturer identity certificate and a signature corresponding to the hashing of the concatenation of the previous information's encrypted with the brand company private key. Then, brand company computer or server encrypts the step certificate with a random key Rk so as to transmit securely the data (step 755). At this stage, brand company computer or server sends a request to a clearing house 700 for encrypting, according to CPRM rules, the random key Rk using media ID, MKB and the random key Rk (step 760). Clearing house 700 encrypts the random key Rk by hashing media ID and the media unique key, and returns the result to the brand company computer or server (step 765). Finally, brand company 705 transmits encrypted random key Rk and encrypted step certificate to requester (step 770). The encrypted random key Rk and encrypted SC are then written into the authenticity certificate (step 775), using CPRM function. As suggested by box 780, the same process applies when the retailer, or any party involved in the supply chain, requests a step certificate.

Figure 8:
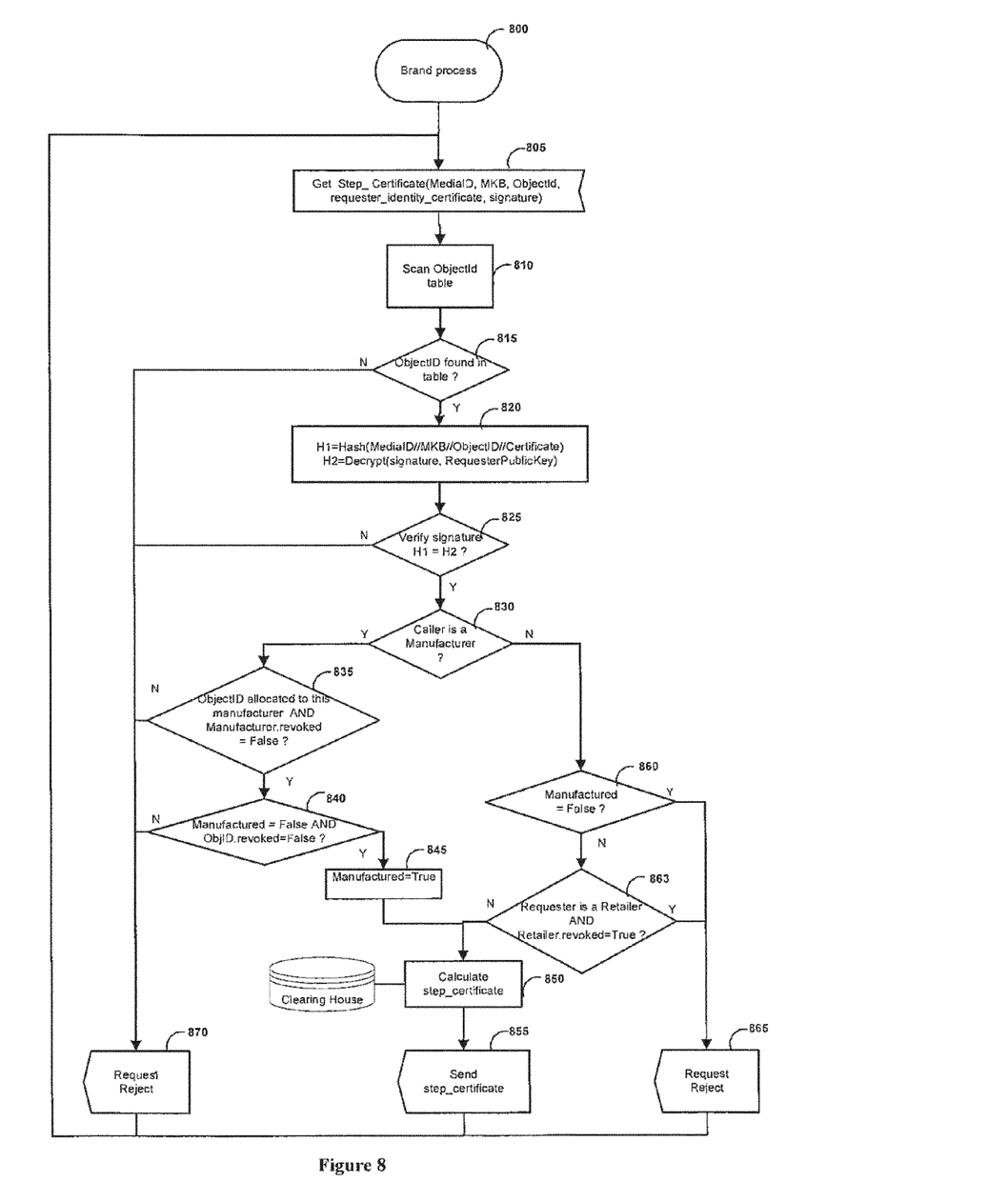
FIG. 8 is a flow chart representing the brand company certificate delivery.

The brand company process and related operations for sending a step certificate are described in the method illustrated by the flow chart of FIG. 8 that includes the following steps, step 800: the method starts upon request for generating a step certificate;

step 805: the brand company receives from the requester a request to get a step certificate, containing a media ID, a media key block (MKB), an object ID, requester identity certificate, and a signature which is a hashing of the concatenation of all arguments transmitted in the message (media ID, MKB, object ID and requester identity certificate). The requester is either the manufacturer, the vendor, or anyone who asks a step certificate;

step 810: the object table e.g., object table 400 of FIG. 4, is scanned in order to determine the validity of the object ID;

step 815: a test is performed to determine whether or not a valid entry is associated to the referenced object ID in the object table. If there is a valid entry, control is given to step 820 else, control is given to step 870;

step 820: values of H1 and H2 are computed. H1 is the result of a cryptographic hash function which processes the original input message containing media ID, MKB, object ID and requester identity certificate to compute a resulting message digest. H2 is the result of a function, using the public key extracted from the caller's identity certificate, decrypting the signature of the message originally calculated by the requester using the same H1 hashing function for which the result has been encrypted by the requester using his/her own private key. These functions implement both the public/private key encryption and the public/private digital signature mechanisms for confidentiality and authentication purposes;

step 825: a test is performed by comparing values H1 and H2. If results are identical, meaning that the signature can be verified and certified (which guarantees that the message originates from the referenced requester and that it has not been altered), control is then given to step 830 otherwise, control is given to step 870;

step 830: a test is performed to determine whether or not the requester is actually known and referenced as a manufacturer by checking the manufacturer table 500. If the requester is known, control is given to step 835 else control is given to step 860;

step 835: a subsequent test is performed to check if the referenced object ID was actually allocated to this particular manufacturer and if the manufacturer has not been revoked. If it is true, then control is given to step 840 otherwise, control is given to step 870;

step 840: another test is performed to determine if the object corresponding to object ID has already been manufactured or not, and if the object ID has not been revoked. If the state of not being manufactured is proven right and the object ID has not been revoked, then control is given to step 845, otherwise control is given to step 870;

step 845: the object is set in "manufactured" state by setting the Boolean variable to true;

step 850: after verifications have been done, the brand company calculates and generates an encrypted step certificate for this particular object;

step 855: the brand company sends the step certificate to the requester, using a secure transmission mechanism over the network;

step 860: as a result of knowing that the requester is not a manufacturer, another test is done to determine whether or not the specified object has already been manufactured. If the state of not being manufactured is proven right, control is given to step 865 otherwise, control is given to step 863;

step 863: a test is done to verify whether or not the requester is a revoked retailer. If it is the case control is given to step 865 for rejecting the step certificate request else, control is given to step 850 for computing and sending back the certificate;

both steps 865 and 870: the requester is informed that request is rejected, none step certificate is transmitted. The process loops back to the starting point to wait for the next request. An error code may be returned to the requester such as "Unknown object ID", "Manufacturer step certificate already delivered for object Id", or any other detectable condition.

As it can be understood by reading the flow chart, several step certificates other than the ones requested by the manufacturer and/or the retailer may be written on the authenticity certificate. These other step certificates are obviously valid if the manufacturer and retailer step certificates are valid, but they may be used in case of stolen merchandise to determine in which step of the supply chain the rob occurred.

Figure 9:
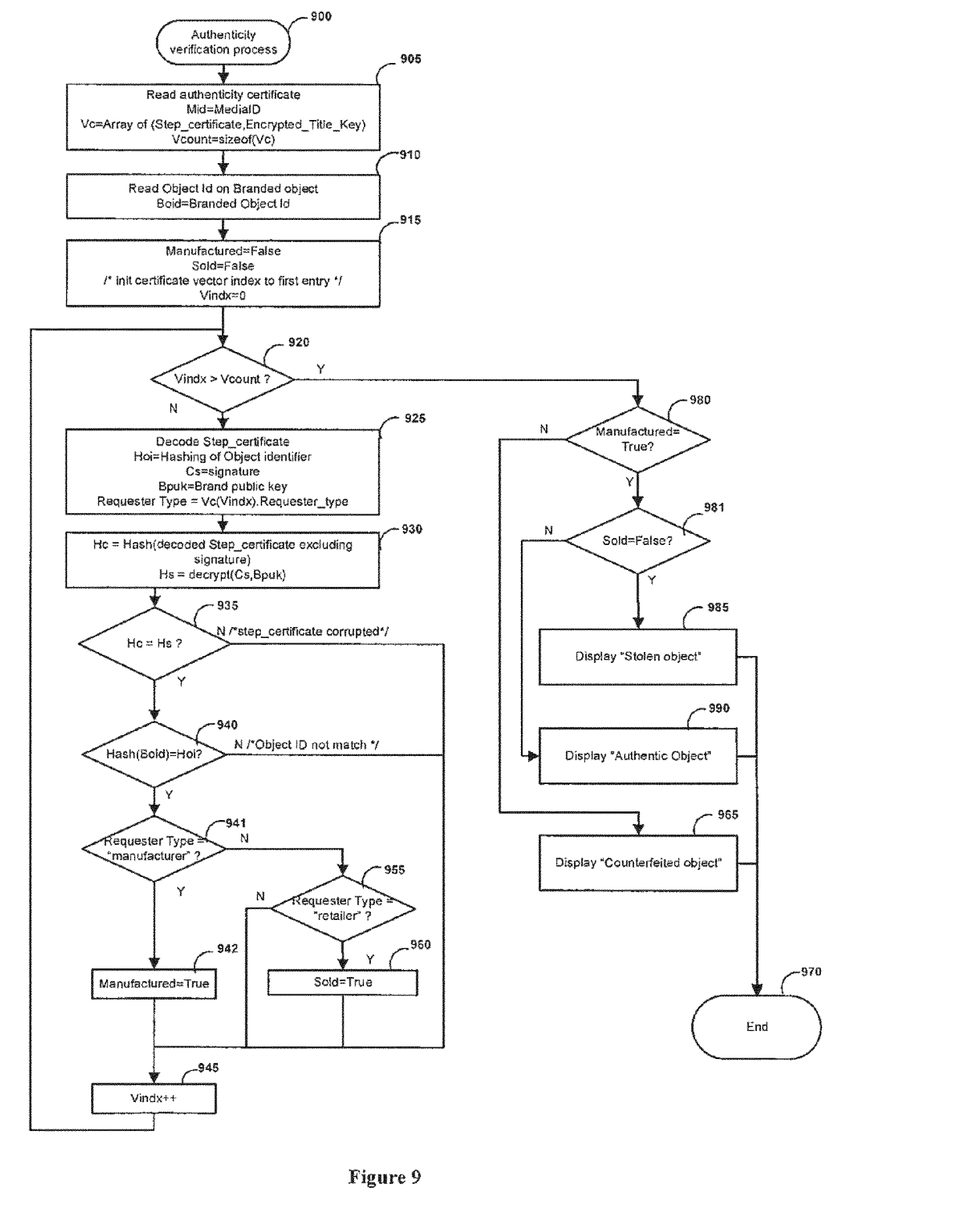
FIG. 9 is a flow chart representing the behavior of the counterfeit detection system.

An example of the authenticity verification process and related operations is illustrated by the flow chart of FIG. 9. The depicted algorithm includes the following steps:

step 900: the method starts upon receiving a request for verifying a brand step certificate;

step 905: all the data of the authenticity certificate are read. These data are media ID, MKB, and all couple of encrypted step certificates and their associated encrypted title keys which are set as an array "Vc". Variable Vcount is initialized with the size of the array containing the newly read step certificates;

step 910: object ID is read using means corresponding to the used technology e.g., an optical reader if the object ID is represented by a bar code, a RFID reader when object ID is the signature of a RFID, or any other mean;

step 915: local Boolean "Manufactured" and "Sold" bits are initialized to "False" and, the object table is scanned in order to determine the validity of the object ID. Variable Vindx is initialized to address the first entry of the array containing the step certificates;

step 920: a test is performed to check whether or not all step certificates have been processed. If all the step certificates have not been processed, control is given to step 925. When all step certificates have been processed, the status of the selected step certificate is examined, starting at step 980;

step 925: the encrypted step certificate is decrypted using encrypted title key, media ID, and MKB. Then, variables are initialized with values retrieved from the decrypted step certificate: Hoi is initialized with the result of the hashing of object ID and Cs is initialized with the signature which is the result of the hashing of the following data encrypted with the brand company private key:

the hashing of the manufactured object ID (that turns the object ID unreadable and undeterminable, and prevents creating counterfeited object with an object identifier corresponding to a stolen authenticity certificate);

the requester identity certificate e.g., manufacturer or retailer;

the requester type e.g., "Manufacturer" or "Retailer";

the brand company identity certificate;

other information such as manufacturing and sale date as well as step certificates of all intermediary parties between the manufacturer and the retailer that may be recorded for traceability purpose;

Bpuk is set to the brand company public key extracted from the brand company identity certificate;

Requester type is initialized with the requester type specified in the step certificate being processed;

step 930; the hashing result "Hc" of the decoded step certificate excluding its signature is computed while the hashing result "Hs" is computed as the decryption of the step certificate signature using the brand company public key "Bpuk";

step 935: newly computed hashing result "Hc" is compared to the hashing result "Hs" received in the signature to verify that the step certificate has not been corrupted. If they match (meaning that the step certificate is not corrupted), then control is given to step 940; otherwise the step certificate is ignored and control is given to step 945;

step 940: a comparison is done between the result of the hashing of object ID read at step 910 on the branded object and the result of the hashing of object ID retrieved from the step certificate at step 925. If the two hashing results are equal, the step certificate is valid and the process continues at step 941, otherwise the step certificate is ignored and the process continues at step 945;

step 941: if the requester is a manufacturer, then control is given to step 942, otherwise control is given to step 955;

step 942: the Boolean manufactured bit is set to "True" to indicate that branded object is not a counterfeited object;

step 945: variable Vindx is incremented to address the next entry of the array containing the step certificates and the process loops to step 920 for examining the next step certificate found on the authenticity certificate;

step 955: if the requester type is a retailer, then control is given to step 960, otherwise control is given to step 945;

step 960: the Boolean Sold bit is set to "True" and the process continues at step 945 for examining the next step certificate found on the authenticity certificate;

step 980: when all step certificates are processed, a test is performed to check if the Boolean "Manufactured" is equal to "True". If it is the case, then control is given to step 981; otherwise control is given to step 965;

step 965: the object being not associated to a valid manufacturer identity certificate, a warning is generated e.g., the message "Counterfeited object" is displayed on the screen of the authenticity verification equipment and control is given to step 970;

step 970: the process is ended;

step 981: a test is performed to check if the Boolean "Sold" bit is "False". If it is the case, control is given to step 990; otherwise control is given to step 985;

step 985: a warning is generated e.g., the message "Stolen object" is displayed on the screen of the authenticity verification equipment and control is given to step 970; and, step 990: as the object is indicated as sold, a corresponding indication is done e.g., the message "Authentic object" is displayed on the screen of the authenticity verification equipment and control is given to step 970.

Figure 10:
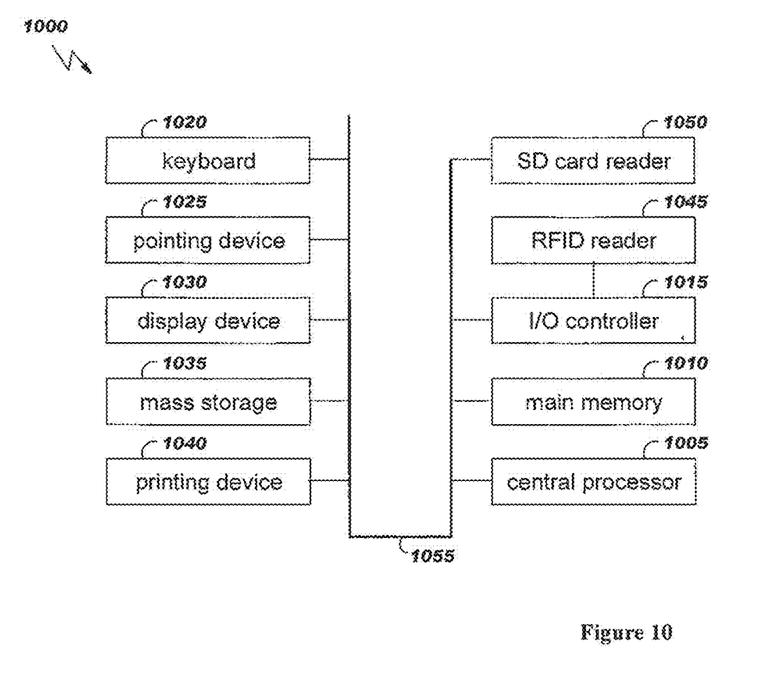
FIG. 10 illustrates a block diagram example of the apparatus for creating authenticity certificates and for detecting counterfeited or stolen objects.

FIG. 10 illustrates a block diagram example of a CPRM enabled computer system 1000 for creating, reading, and validating the authenticity certificates. Computer system 1000 e.g., an IBM-compatible personal computer or a handheld device, comprises a central processor 1005, a main memory 1010, an input/output controller 1015, a keyboard 1020, a pointing device 1025 e.g., a mouse, a track ball, or a pen device, a display device 1030, and a mass storage 1035 e.g., hard disk. Additional input/output devices, such as a printing device 1040, can be included in the computer system 1000 as desired. According to a preferred embodiment, the computer system 1000 further comprises a RFID reader 1045, a bar code reader, or any other means adapted to read the object identifier, and a SD card memory reader 1050 (or the reader adapted to access the CPRM compliant memory device storing the authenticity certificates). These two readers can be grouped in an independent apparatus connected to the computer by a wired mean such as a USB port or short range wireless link such as radio or infrared links. As illustrated, the various components of the computer system 1000 preferably communicate through a system bus 1055 or similar architecture. A computer software is provided for directing the operation of the computer system 1000. Such software, preferably stored in main memory 1010 and/or on mass storage 1035, includes a kernel, or operating system, and a shell, or interface. This software can be loaded i.e., transferred, from mass storage 1035 to main memory 1010, for execution on a processor (e.g., central processor 1005) of the computer system 1000. The computer system 1000 receives user commands and data through user interface, preferably a graphical user interface (GUI), that is also used to display results.

Naturally, in order to satisfy local and specific requirements, a person skilled in the art may apply to the solution described above many modifications and alterations all of which, however, are included within the scope of protection of the invention as defined by the following claims. In particular, the invention can be implemented with any CPRM technology variant, such as the Advanced Access Content System (AACS) or the likes.

What is claimed is:

1. A method, said method comprising:
   receiving, by a processor of a computer system from a requester entity, a request for a step certificate, said step certificate authenticating an involvement of the requester entity about an object, said request comprising, an object identifier, a requester entity type of the requester entity, and a requester identity certificate of the requester entity, wherein the object identifier identifies the object;
   after said receiving the request, said processor hashing the object identifier;
   after said hashing the object identifier, said processor creating a signature comprising the hashed object identifier, the requester entity type, a certifier identity certificate of a certifier entity that has certified the authenticity of the object, and the requester identity certificate;
   said processor generating a hashing result by hashing a concatenation of the object identifier, the requester entity type, the certifier entity certificate, the requester identity certificate, and the signature; and
   said processor generating the step certificate comprising the hashing result.

2. The method of claim 1, said method further comprising:
   said processor encrypting the step certificate using a random key; and
   said processor sending the encrypted step certificate to the requester entity for subsequently storing the step certificate on a media.

3. The method of claim 2, wherein the request further comprising a media identifier and a media key block, wherein the media identifier identifies the media and is unique to the media, wherein the media key block is a data block of the media providing access to a media key used to unlock a title key stored on the media, and wherein the title key is configured to encrypt data stored on the media, and wherein the method further comprises:
   said processor receiving the random key encrypted, wherein the encrypted random key is based on the random key, the media identifier, and the media key block; and
   said processor sending the encrypted random key to the requester entity.

4. The method of claim 3, wherein the data block of the media provides access to a media key used to unlock a title key stored on the media, and wherein the title key is configured to encrypt data stored on the media.

5. The method of claim 3, wherein the method further comprises:
   after said encrypting the step certificate, said processor transmitting the random key, the media identifier, and the media key block to a clearing house, wherein said receiving the random key encrypted comprises receiving the encrypted random key from the clearing house.

6. The method of claim 3, said method further comprising:
   after said receiving the request, said processor verifying the signature, said verifying the signature comprising:
   generating a first hash result (H1) by applying a hash function to an input message comprising the media identifier, the media key block, the object identifier, and the requester identity certificate;
   extracting a public key from the requestor identity certificate, said requestor identity certificate having been encrypted by a private key of the requester entity, said public key and said private key being a public/private key pair;
   decrypting a signature of the input message through use of the public key;
   generating a second hash result (H2) by applying the hash function to the decrypted signature of the input message; and
   determining that H1 and H2 are identical.

7. The method of claim 1, said method further comprising:
   said processor verifying a validity of the object identifier, wherein said verifying the validity of the object identifier comprises scanning an object table, wherein said scanning comprises determining that the object identifier exist as an entry in an objectID column of the object table, and wherein the objectID column comprises an object identifier of a different object for each different row of a plurality of rows of the table.

8. The method of claim 1, said method further comprising:
said processor determining that a manufacturer has manufactured the object, and wherein the requester entity is the manufacturer.

9. A computer readable hardware storage device comprising instructions that when executed on a processor of a computer system performs a method, said method comprising:
said processor receiving, from a requester entity, a request for a step certificate, said step certificate authenticating an involvement of the requester entity about an object, said request comprising, an object identifier, a requester entity type of the requester entity, and a requester identity certificate of the requester entity, wherein the object identifier identifies the object;
after said receiving the request, said processor hashing the object identifier;
after said hashing the object identifier, said processor creating a signature comprising the hashed object identifier, the requester entity type, a certifier identity certificate of a certifier entity that has certified the authenticity of the object, and the requester identity certificate;
said processor generating a hashing result by hashing a concatenation of the object identifier, the requester entity type, the certifier entity certificate, the requester identity certificate, and the signature; and
said processor generating the step certificate comprising the hashing result.

10. The computer readable hardware storage device of claim 9, said method further comprising:
said processor encrypting the step certificate using a random key; and
said processor sending the encrypted step certificate to the requester entity for subsequently storing the step certificate on a media.

11. The computer readable hardware storage device of claim 10, wherein the request further comprising a media identifier and a media key block, wherein the media identifier identifies the media and is unique to the media, wherein the media key block is a data block of the media providing access to a media key used to unlock a title key stored on the media, and wherein the title key is configured to encrypt data stored on the media, and wherein the method further comprises:
said processor receiving the random key encrypted, wherein the encrypted random key is based on the random key, the media identifier, and the media key block; and
said processor sending the encrypted random key to the requester entity.

12. The computer readable hardware storage device of claim 11, wherein the data block of the media provides access to a media key used to unlock a title key stored on the media, and wherein the title key is configured to encrypt data stored on the media.

13. The computer readable hardware storage device of claim 11, wherein the method further comprises:
after said encrypting the step certificate, said processor transmitting the random key, the media identifier, and the media key block to a clearing house, wherein said receiving the random key encrypted comprises receiving the encrypted random key from the clearing house.

14. The computer readable hardware storage device of claim 11, said method further comprising: after said receiving the request, said processor verifying the signature, said verifying the signature comprising:
generating a first hash result (H1) by applying a hash function to an input message comprising the media identifier, the media key block, the object identifier, and the requester identity certificate;
extracting a public key from the requestor identity certificate, said requestor identity certificate having been encrypted by a private key of the requester entity, said public key and said private key being a public/private key pair;
decrypting a signature of the input message through use of the public key;
generating a second hash result (H2) by applying the hash function to the decrypted signature of the input message; and
determining that H1 and H2 are identical.

15. A computer system comprising a processor, a memory coupled to the processor, and a computer readable storage device coupled to the processor, said storage device containing instructions which, upon being executed by the processor via the memory, implements a method, said method comprising:
said processor receiving, from a requester entity, a request for a step certificate, said step certificate authenticating an involvement of the requester entity about an object, said request comprising, an object identifier, a requester entity type of the requester entity, and a requester identity certificate of the requester entity, wherein the object identifier identifies the object;
after said receiving the request, said processor hashing the object identifier;
after said hashing the object identifier, said processor creating a signature comprising the hashed object identifier, the requester entity type, a certifier identity certificate of a certifier entity that has certified the authenticity of the object, and the requester identity certificate;
said processor generating a hashing result by hashing a concatenation of the object identifier, the requester entity type, the certifier entity certificate, the requester identity certificate, and the signature; and
said processor generating the step certificate comprising the hashing result.

16. The computer system of claim 15, said method further comprising:
said processor encrypting the step certificate using a random key; and
said processor sending the encrypted step certificate to the requester entity for subsequently storing the step certificate on a media.

17. The computer system of claim 16, wherein the request further comprising a media identifier and a media key block, wherein the media identifier identifies the media and is unique to the media, wherein the media key block is a data block of the media providing access to a media key used to unlock a title key stored on the media, and wherein the title key is configured to encrypt data stored on the media, and wherein the method further comprises:
said processor receiving the random key encrypted, wherein the encrypted random key is based on the random key, the media identifier, and the media key block; and
said processor sending the encrypted random key to the requester entity.

18. The computer system of claim 17, wherein the data block of the media provides access to a media key used to unlock a title key stored on the media, and wherein the title key is configured to encrypt data stored on the media.

19. The computer system of claim 17, wherein the method further comprises:
   after said encrypting the step certificate, said processor transmitting the random key, the media identifier, and the media key block to a clearing house, wherein said receiving the random key encrypted comprises receiving the encrypted random key from the clearing house.

20. The computer system of claim 17, said method further comprising: after said receiving the request, said processor verifying the signature, said verifying the signature comprising:
   generating a first hash result (H1) by applying a hash function to an input message comprising the media identifier, the media key block, the object identifier, and the requester identity certificate;
   extracting a public key from the requestor identity certificate, said requestor identity certificate having been encrypted by a private key of the requester entity, said public key and said private key being a public/private key pair;
   decrypting a signature of the input message through use of the public key;
   generating a second hash result (H2) by applying the hash function to the decrypted signature of the input message; and
   determining that H1 and H2 are identical.

\* \* \* \* \*